US012051840B2

(12) United States Patent
Marek et al.

(10) Patent No.: US 12,051,840 B2
(45) **Date of Patent: *Jul. 30, 2024**

(54) HIGH FREQUENCY, SURFACE MOUNTABLE MICROSTRIP BAND PASS FILTER

(71) Applicant: KYOCERA AVX Components Corporation, Fountain Inn, SC (US)

(72) Inventors: Michael Marek, Jerusalem (IL); Elinor O'Neill, Jerusalem (IL); Ronit Nissim, Jerusalem (IL)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,214

(22) Filed: Aug. 24, 2022

(65) Prior Publication Data

US 2022/0416385 A1 Dec. 29, 2022

Related U.S. Application Data

(63) Continuation of application No. 16/794,320, filed on Feb. 19, 2020, now Pat. No. 11,431,069.

(Continued)

(51) Int. Cl.
*H01P 1/203* (2006.01)
*H01P 3/08* (2006.01)
*H01P 11/00* (2006.01)

(52) U.S. Cl.
CPC .............. *H01P 1/203* (2013.01); *H01P 3/081* (2013.01); *H01P 11/003* (2013.01); *H01P 11/007* (2013.01)

(58) Field of Classification Search
CPC ....... H01P 1/203; H01P 11/003; H01P 11/007
See application file for complete search history.

(56) References Cited

U.S. PATENT DOCUMENTS 6,130,189 A 10/2000 Matthaei
6,483,404 B1 11/2002 Ammar et al.
(Continued)

FOREIGN PATENT DOCUMENTS

EP 2 202 840 A1 6/2010
JP H 09232807 A 9/1997
(Continued)

OTHER PUBLICATIONS

International Search Report and Written Opinion for PCT/US2020/0148813, dated Jun. 16, 2020, 12 pages.

*Primary Examiner* — Andrea Lindgren Baltzell
*Assistant Examiner* — Kimberly E Glenn
(74) *Attorney, Agent, or Firm* — Dority & Manning, P.A.

(57) ABSTRACT

A high frequency, stripline filter may have a bottom surface for mounting to a mounting surface. The filter may include a monolithic base substrate having a top surface and a plurality of thin-film microstrips, including a first thin-film microstrip and a second thin-film microstrip, formed over the top surface of the substrate. Each of the plurality of thin-film microstrips may have a first arm, a second arm parallel to the first arm, and a base portion connected with the first and second arms. A port may be exposed along the bottom surface of the filter. A conductive path may include a via formed in the substrate. The conductive path may electrically connect the first thin-film microstrip with the port on the bottom surface of the filter. The filter may exhibit an insertion loss that is greater than −3.5 dB at a frequency that is greater than about 15 GHz.

20 Claims, 6 Drawing Sheets

Related U.S. Application Data

(60) Provisional application No. 62/811,674, filed on Feb. 28, 2019.

(56) References Cited

U.S. PATENT DOCUMENTS

| | | | |
|---|---|---|---|
| 6,823,201 | B2 | 11/2004 | Kai et al. |
| 7,855,621 | B2 | 12/2010 | Guan |
| 7,965,158 | B2 | 6/2011 | Soora |
| 8,258,896 | B2 | 9/2012 | Soora |
| 9,209,504 | B2 | 12/2015 | Denis et al. |
| 9,876,479 | B2 | 1/2018 | Mi et al. |
| 2004/0246071 | A1 | 12/2004 | Rottmoser et al. |
| 2005/0088258 | A1 | 4/2005 | Fischer |

FOREIGN PATENT DOCUMENTS

| | | | | |
|---|---|---|---|---|
| KR | 10-1870201 | B1 | 6/2018 | |
| TW | 200503321 | A | 1/2005 | |
| WO | WO 01/56107 | A1 | 8/2001 | |
| WO | WO-0156107 | A1 * | 8/2001 | .......... H01P 1/20372 |

* cited by examiner

HIGH FREQUENCY, SURFACE MOUNTABLE MICROSTRIP BAND PASS FILTER

CROSS REFERENCE TO RELATED APPLICATIONS

The present application is a continuation of U.S. application Ser. No. 16/794,320, filed on Feb. 19, 2020, which claims filing benefit of U.S. Provisional Patent Application Ser. No. 62/811,674 having a filing date of Feb. 28, 2019, which are incorporated herein by reference in their entirety.

BACKGROUND OF THE INVENTION

High frequency radio signal communication has increased in popularity. For example, the demand for increased data transmission speed for wireless smartphone connectivity has driven demand for high frequency components, including those configured to operate at 5G spectrum frequencies. A trend towards miniaturization has also increased the desirability of small, passive components for handling such high frequency signals. Miniaturization has also increased the difficulty of surface mounting small, passive components suitable for operation at high frequencies (e.g., in the 5G frequency spectrum).

SUMMARY

In accordance with one embodiment of the present invention, a high frequency, stripline filter may have a bottom surface for mounting to a mounting surface. The filter may include a monolithic base substrate having a top surface, a length in an X-direction, a width in a Y-direction that is perpendicular to the X-direction, and a thickness in a Z-direction that is perpendicular to each of the X-direction and Y-direction. The filter may include a plurality of thin-film microstrips including a first thin-film microstrip and a second thin-film microstrip. Each of the plurality of thin-film microstrips may have a first arm, a second arm parallel to the first arm, and a base portion connected with the first and second arms. The plurality of thin-film microstrips may be formed over the top surface of the monolithic base substrate. The filter may include a port exposed along the bottom surface of the filter. A conductive path may include a via formed in the monolithic base substrate. The conductive path may electrically connect the first thin-film microstrip with the port on the bottom surface of the filter. The filter may exhibit an insertion loss that is greater than −3.5 dB at a test frequency that is greater than about 15 GHz.

In accordance with another embodiment of the present invention, a high frequency, stripline filter may have a bottom surface for mounting to a mounting surface. The filter may include a monolithic base substrate having a top surface, a length in an X-direction, a width in a Y-direction that is perpendicular to the X-direction, and a thickness in a Z-direction that is perpendicular to each of the X-direction and Y-direction. A plurality of thin-film microstrips may be formed over the top surface of the monolithic base substrate. The plurality of thin-film microstrips may include a first thin-film microstrip and a second thin-film microstrip. Each of the plurality of thin-film microstrips may have a first arm, a second arm parallel to the first arm, and a base portion connected with the first and second arms. The base portion may be perpendicular to the first and second arms. A port may be exposed along the bottom surface of the filter. A conductive path may connect the first arm of the thin-film microstrip to the port. The conductive path may include a via formed in the monolithic base substrate. The conductive path may have an effective length between the first arm of the thin-film microstrip and the port that ranges from about 95% to about 105% of $\lambda/4$, where $\lambda$ is a wavelength that corresponds with a passband frequency propagating through the monolithic base substrate.

In accordance with another embodiment of the present invention, a method of forming a high frequency, stripline filter having a bottom surface for mounting to a mounting surface may include providing a monolithic base substrate having a top surface; forming a plurality of thin-film microstrips comprising a first thin-film microstrip and a second thin-film microstrip over the top surface of the monolithic base substrate; depositing a port along the bottom surface of the filter; and forming a via in the monolithic base substrate that electrically connects the first thin-film microstrip with the port on the bottom surface of the filter. The filter exhibits an insertion loss that is greater than −3.5 dB at a test frequency that is greater than about 15 GHz.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

Figure 1A:
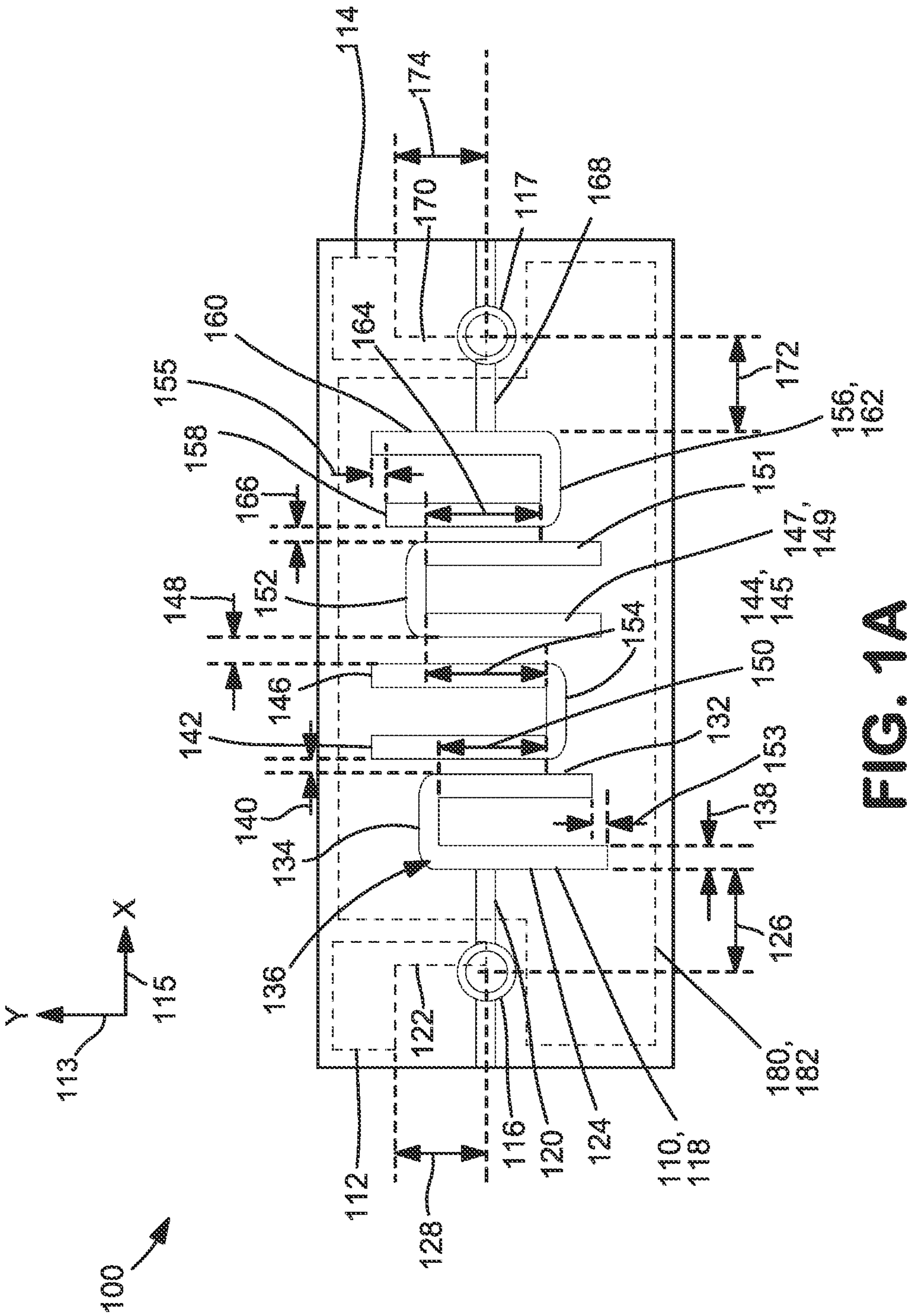
FIG. 1A illustrates a top down view of one embodiment of a high frequency, stripline filter in accordance with aspects of the present disclosure.

Repeat use of reference characters throughout the present specification and appended drawings is intended to represent same or analogous features or elements of the invention.

DETAILED DESCRIPTION OF REPRESENTATIVE EMBODIMENTS

A surface mountable filter is provided that is particularly useful in high frequency circuits, including those operating in the 5G frequency spectrum. The 5G frequency spectrum generally extends from about 20 GHz to about 30 GHz, or higher. The disclosed filter may generally be configured as a band pass filter. However, in some embodiments, the filter may be configured as a low pass or high pass filter. Exemplary uses include 5G signal processing (e.g., by a 5G base station), smartphones, signal repeaters (e.g., small cells), relay stations, radar, radio frequency identification (RFID) devices.

The present inventors have discovered that through the selective control over the arrangement of the thin-film microstrips and vias, a compact, surface mountable high frequency stripline filter can be achieved that exhibits excellent performance characteristics, such as an insertion loss that is greater than −3.5 dB at a pass band frequency (e.g., within a passband frequency range of the filter) that is greater than about 15 GHz (e.g., at about 28 GHz). Such excellent performance characteristics are desirable in a compact, surface-mountable package, for example, that is configured for grid array-type surface mounting (e.g., land grid array (LGA), ball grid array (BGA), etc.).

In some embodiments the filter exhibits an insertion loss that is greater than −3.5 dB at a frequency (e.g., within the pass band frequency range) that is greater than about 15 GHz (e.g., at about 28 GHz), in some embodiments greater than about −3.2 dB, in some embodiments greater than about −3.0 dB, in some embodiments greater than about −2.8 dB, in some embodiments greater than about −2.6 dB, in some embodiments greater than about −2.4 dB, in some embodiments greater than about −2.2 dB, in some embodiments greater than about −2.0 dB, and in some embodiments greater than about −1.8 dB. For example, the filter can exhibit the insertion loss values above across some or all of a band pass filter range of the filter.

In some embodiments, the filter may exhibits an insertion loss response that is greater than −3.5 dB across a frequency range of 2 GHz (e.g., from about 27 GHz to about 29 GHz), in some embodiments across a frequency range of 1.5 GHz (e.g., from about 27.25 GHz to about 28.25 GHz), in some embodiments across a frequency range of 1 GHz (e.g., from about 27.50 GHz to about 28.50 GHz), in some embodiments across a frequency range of 0.5 (e.g., from about 27.25 GHz to about 28.25 GHz), in some embodiments across a frequency range of 0.4 GHz (e.g., from about 27.80 GHz to about 28.20 GHz), and in some embodiments across a frequency range of 0.2 GHz (e.g., from about 27.90 GHz to about 28.10 GHz).

However, it should be understood that, in some embodiments the insertion loss response described above can be exhibited at frequencies that are less than 15 GHz. For example, the fitler can exhibit an insertion loss that is greater than −3.5 dB at a frequency (e.g., within the pass band frequency range) that is greater than about 3 GHz, in some embodiments greater than about −3.2 dB, in some embodiments greater than about −3.0 dB, in some embodiments greater than about −2.8 dB, in some embodiments greater than about −2.6 dB, in some embodiments greater than about −2.4 dB, in some embodiments greater than about −2.2 dB, in some embodiments greater than about −2.0 dB, and in some embodiments greater than about −1.8 dB. For example, the filter can exhibit the insertion loss values above across some or all of a band pass filter range of the filter.

The filter may exhibit excellent return loss characteristics. For example, in some embodiments, the filter may exhibit a return loss that is less than about −20 dB at the test frequency, in some embodiments less than about −25 dB, in some embodiments less than about −30 dB, in some embodiments less than about −35 dB, in some embodiments less than about −37 dB, in some embodiments less than about −40 dB, in some embodiments less than about −42 dB, and in some embodiments less than about −45 dB.

In some embodiments, the filter may exhibit a return loss response that is greater than about −20 dB a frequency range of 2 GHz (e.g., from about 27 GHz to about 29 GHz), in some embodiments across a frequency range of 1.5 GHz (e.g., from about 27.25 GHz to about 28.25 GHz), in some embodiments across a frequency range of 1 GHz (e.g., from about 27.50 GHz to about 28.50 GHz), in some embodiments across a frequency range of 0.5 (e.g., from about 27.25 GHz to about 28.25 GHz), in some embodiments across a frequency range of 0.4 GHz (e.g., from about 27.80 GHz to about 28.20 GHz), and in some embodiments across a frequency range of 0.2 GHz (e.g., from about 27.90 GHz to about 28.10 GHz).

Additionally, the pass band frequency range of the filter may be centered about a frequency of about 28 GHz. However, in other embodiments, the pass band frequency range may be centered about a frequency that ranges from about 15 GHz to about 28 GHz. In yet other embodiments, the pass band frequency range may be centered about a frequency that ranges from about 28 GHz to about 45 GHz, or higher.

The filter may generally be compact. For example, the filter may have a length that is less than about 5 mm, in some embodiments less than about 4 mm, in some embodiments less than about 3 mm, and in some embodiments less than about 2 mm. The filter may have a width that is less than about 3 mm, in some embodiments less than about 2 mm, and in some embodiments less than about 1 mm. For example, the filter may have an EIA case size of 1806, 1515, 1410, 1210, 1206, 1111, 1008, 0805, or smaller. In an exemplary embodiment the filter has an EIA case size of 1206.

The filter may include a base substrate. The filter may include a plurality of thin-film microstrips (e.g., a first thin-film microstrip, a second thin-film microstrip, etc.) formed over the top surface of the monolithic base substrate. At least one via may be formed in the monolithic base substrate that electrically connects one of the thin-film microstrips with a port exposed along the bottom of the filter. The port may be formed over a bottom surface of the monolithic base substrate that is opposite the top surface of the monolithic base substrate. For example, an input port and output port may each be exposed along the bottom of the filter. An input via may connect the input port with one of the thin-film microstrips. An output via may connect the output port with another of the thin-film microstrips.

As used herein, "formed over," may refer to a layer that is directly in contact with another layer. However, intermediate layers may also be formed therebetween. Additionally, when used in reference to a bottom surface, "formed over" may be used relative to an exterior surface of the component. Thus, a layer that is "formed over" a bottom surface may be closer to the exterior of the component than the layer over which it is formed.

The connections between the port(s) and the thin-film microstrips may be particularly designed to tune the performance of the filter. For example, a total length of the conductive path between the thin-film microstrips and the input port and/or output port may correspond with approximately one quarter of a wavelength of a pass band center frequency propagating through the monolithic base substrate material (and cover substrate material, if present). More specifically, the wavelength, λ, is generally dependent on the dielectric constant of the surrounding material (e.g., the material of the monolithic base substrate and/or cover substrate). The wavelength, λ, through a material having a dielectric constant, $\varepsilon_r$, can be calculated as follows:

$$\lambda = \frac{C}{f\sqrt{\varepsilon_r}}$$

where C represents the speed of light in a vacuum, and f represents the frequency.

The conductive path between the first thin-film microstrip and input port may include one or more conductive strips. For example, the first thin-film microstrip may include a first arm elongated in the X-Y plane (e.g., in the Y-direction). The filter may include a top conductive strip that is elongated in the X-Y plane (e.g., X-direction). The top conductive strip may be formed over the top surface of the monolithic base substrate and connected with each of the via and the first arm of the first thin-film microstrip. A bottom conductive strip may be connected with each of the via and the port. The bottom conductive strip may be elongated in the Y-direction. Thus, in some embodiments, the top conductive strip may be perpendicular to the bottom conductive strip, which may provide a compact configuration. However, in other embodiments the top conductive strip and bottom conductive strip may form any suitable angle therebetween (e.g., 0 to 360 degrees).

The top conductive strip may have a top conductive strip effective length in the X-Y plane (e.g., in the X-direction) between the arm of the first thin-film microstrip and the via. The bottom conductive strip may have a bottom conductive strip effective length in the X-Y plane (e.g., in the Y-direction) between the via and the port. The via may have a via length in the Z-direction. A total conductive path length may equal a sum of the top conductive strip effective length, the bottom conductive strip effective length, and the via length. The total conductive path length may equal about $\lambda/4$, where $\lambda$ is a wavelength that corresponds with a pass band frequency (e.g., a pass band center frequency) propagating through the monolithic base substrate. The wavelength, $\lambda$, may correspond with any frequency within the pass band frequency range of the filter. In other embodiments, the total conductive path length may be proportional to $\lambda/4$ (e.g., $n\lambda/4$, where n is an integer ranging from 1 to 5, or higher). For example, the total conductive path may range from about 95% to 105% of $n\lambda/4$, in some embodiments from about 96% to about 104%, in some embodiments from about 97% to about 103%, in some embodiments from about 98% to about 102%, and in some embodiments from about 99% to about 101%.

The thin-film microstrips may generally be U-shaped. For example, the first thin-film microstrip may include a pair of parallel arms and a base portion connected with the pair of parallel arms. The base portion may be perpendicular to the pair of parallel arms. In some embodiments, the first thin-film microstrip may have at least one rounded outer corner between at least one of the pair of parallel arms and the base portion of the first thin-film microstrip. Such rounded corners may reduce charge concentrations that may otherwise adversely affect performance of the filter.

At least one of the parallel arms of the first thin-film microstrip may have a width that is less than about 200 microns, in some embodiments less than about 150 microns, in some embodiments less than about 100 microns, and in some embodiments less than about 70 microns.

The thin-film microstrips may be spaced apart to provide electromagnetic resonance at one or more select frequencies. In some embodiments, the thin-film microstrips may be spaced apart from other thin-film microstrips by respective spacing distances. In some embodiments, multiple, distinct spacing distances may be employed to provide resonance at distinct frequencies within the passband frequency range of the filter. More specifically, the first thin-film microstrip may have an arm that is elongated in a Y-direction in an X-Y plane that is parallel with the top surface of the monolithic base substrate. The second thin-film microstrip may have a first arm that is elongated in the Y-direction and spaced apart by a first spacing distance from the arm of the first thin-film microstrip in the X-direction. The first spacing distance may be less than about 250 microns, in some embodiments less than about 150 microns, in some embodiments less 120, in some embodiments less than about 90 microns, and in some embodiments less than about 60 microns.

The second thin-film microstrip may have a second arm that is elongated in the Y-direction. A third thin-film microstrip may have an arm that is elongated in the Y-direction and spaced apart in the X-direction from the second arm of the second thin-film microstrip by a second spacing distance. The second spacing distance may be different than the first spacing distance.

For example, in some embodiments, the second spacing distance may be greater than the first spacing distance. A ratio of the second spacing distance to the first spacing distance may range from about 1.1 to about 10, in some embodiment from about 1.5 to about 5, and in some embodiments from about 2 to about 3. However, in other embodiments, the ratio of the second spacing distance to the first spacing distance may range from about 0.1 to about 0.9, in some embodiments from about 0.2 to about 0.8, and in some embodiments from about 0.3 to about 0.4.

The second spacing distance may be less than about 250 microns, in some embodiments less than about 150 microns, in some embodiments less 120, in some embodiments less than about 90 microns, and in some embodiments less than about 60 microns. The first spacing distance may be less than about 250 microns, in some embodiments less than about 150 microns, in some embodiments less 120, in some embodiments less than about 90 microns, and in some embodiments less than about 60 microns.

The arms of the thin-film microstrips may form overlapping distances therebetween. The length of the overlapping distances may be selected to tune the performance characteristics of the filter. More specifically, multiple different overlapping distances may be employed in some embodiments. For example, the first arm of the second thin-film microstrip and the arm of the first thin-film microstrip may overlap in the Y-direction along a first overlapping length. The second arm of the second thin-film microstrip and the first arm of the third thin-film microstrip may overlap in the Y-direction along a second overlapping length. The first overlapping length may be different from the second overlapping length. In some embodiments, the second overlapping length may be greater than the first overlapping length. For example, the second overlapping length may be about 104% to about 125% of the first overlapping length, in some embodiments from about 106% to about 120%, in some embodiments from about 108% to about 115%. However, in other embodiments, the second overlapping length may be less than the first overlapping length. For example, the second overlapping length may be about 75% to about 96% of the first overlapping length, in some embodiments about 80% to about 93%, and in some embodiments from about 85% to about 90%. In further embodiments, the second overlapping length may be approximately equal to the first overlapping length (e.g., about 96% to about 104% of the second overlapping length).

A fourth thin-film microstrip may have a first arm, a second arm, and a base portion connecting the first arm and the second arm. The first arm of the fourth thin-film microstrip may overlap the second arm of the third thin-film microstrip along a third overlapping length. In some embodiments, the third overlapping length may be different from one or both of the first overlapping length and the second overlapping length. For example, the third overlapping length 164 may be about 75% to about 96% or about 104% to about 125% of the first overlapping length 150. In other embodiments, the third overlapping length 164 may be approximately equal to the first overlapping length. For example, the third overlapping length may be about 97% to about 103% of the first overlapping length.

The monolithic base substrate may have a bottom surface opposite the top surface. The filter may include a ground plane formed over the bottom surface of the filter. The ground plane may have a perimeter in an X-Y plane that is parallel with the top surface of the monolithic base substrate. At least one of the first thin-film microstrip or the second thin-film microstrip may be contained within the perimeter of the ground plane of in the X-Y plane.

In some embodiments, the filter may include a first protective layer formed over the top surface of the monolithic base substrate and thin-film microstrips. For example, a cover substrate may be formed over the top surface of the monolithic base substrate. The cover substrate may include a suitable ceramic dielectric material, as described below. The cover substrate may have a thickness that ranges from about 100 microns to about 600 microns, in some embodiments from about 125 microns to about 500 microns, in some embodiments from about 150 microns to about 400 microns, and in some embodiments from about 175 microns to about 300 microns.

In other embodiments, the first protective layer may include a layer of a polymeric material, such as polyimide, SiNO, $Al_2O_3$, $SiO_2$, $Si_3N_4$, benzocyclobutene, or glass. In such embodiments, the first protective layer may have a thickness that ranges from about 1 micron to about 300 microns, in some embodiments from about 5 microns to about 200 microns, and in some embodiments from about 10 microns to about 100 microns.

In some embodiments, a second protective layer may be formed over the bottom surface of the filter. The second protective layer may include a polymeric material, such as polyimide, SiNO, $Al_2O_3$, $SiO_2$, $Si_3N_4$, benzocyclobutene, or glass. The ports and/or ground plane may protrude through the second protective layer such that the ports and/or ground plane are exposed along the bottom surface of the filter for surface mounting the filter, for example as described below.

In some embodiments, the monolithic base substrate may have a thickness that ranges from about 100 microns to about 600 microns, in some embodiments from about 125 microns to about 500 microns, in some embodiments from about 150 microns to about 400 microns, and in some embodiments from about 175 microns to about 300 microns.

The monolithic base substrate and/or cover substrate may include a material having a dielectric constant that is less than about 30 as determined in accordance with ASTM D2520-13 at an operating temperature of 25° C. and frequency of 28 GHz, in some embodiments less than about 25, in some embodiments less than about 20, and in some embodiments less than about 15. However, in other embodiments, a material having a dielectric constant higher than 30 may be used to achieve higher frequencies and/or smaller components. For example, in such embodiments, the dielectric constant may range from about 30 to about 120, or greater as determined in accordance with ASTM D2520-13 at an operating temperature of 25° C. and frequency of 28 GHz, in some embodiments from about 50 to about 100, and in some embodiments from about 70 to about 90.

The base substrate and/or cover substrate may comprise one or more suitable ceramic materials. Suitable materials are generally electrically insulating and thermally conductive. For example, in some embodiments, the substrate may include alumina ($Al_2O_3$), aluminum nitride (AlN), beryllium oxide (BeO), aluminum oxide ($Al_2O_3$), boron nitride (BN), silicon (Si), silicon carbide (SiC), silica ($SiO_2$), silicon nitride ($Si_3N_4$), gallium arsenide (GaAs), gallium nitride (GaN), zirconium dioxide ($ZrO_2$), mixtures thereof, oxides and/or nitrides of such materials, or any other suitable ceramic material. Additional example ceramic materials include barium titanate ($BaTiO_3$), calcium titanate ($CaTiO_3$), zinc oxide (ZnO), ceramics containing low-fire glass, other glass-bonded materials, sapphire, and ruby.

The thin film components (e.g., microstrips, conductive strips) formed on a top surface of the base substrate may have thicknesses in the Z-direction that range from about 0.05 micrometers to about 50 micrometers, in some embodiments from about 0.1 micrometers to about 20 micrometers, in some embodiments from about 0.3 micrometer to about 10 micrometers, and in some embodiments from about 1 micrometer to about 5 micrometers.

The thin film components may be formed from a variety of suitable electrically conductive materials. Example materials include copper, nickel, gold, tin, lead, palladium, silver, and alloys thereof. Any conductive metallic or non-metallic material that is suitable for thin film fabrication may be used, however.

The thin film components may be precisely formed using a variety of suitable subtractive, semi-additive, or fully additive processes. For example, physical vapor deposition and/or chemical deposition may be used. For instance, in some embodiments, the thin film components may be formed using sputtering, a type of physical vapor deposition. A variety of other suitable processes may be used, however, including plasma-enhanced chemical vapor deposition (PECVD) and electroless plating, for example. Lithography masks and etching may be used to produce the desired shape of the thin film components. A variety of suitable etching techniques may be used including dry etching using a plasma of reactive or non-reactive gas (e.g., argon, nitrogen, oxygen, chlorine, boron trichloride) and/or wet etching.

One or more ports may be exposed along a bottom surface of the filter for surface mounting the component to a mounting surface, such as a printed circuit board (PCB). For example, the filter may be configured for grid array-type surface mounting, such as land grid array (LGA) type mounting, ball grid array (BGA) type mounting, or any other suitable type of grid array-type surface mounting. As such, the ports may not extend along the side surfaces of the base substrate, for example as with a surface mount device (SMD). As such, in some embodiments side surfaces of the substrate may be free of conductive material.

The second protective layer may be formed using photolithography techniques in a manner that leaves openings or windows through which the ports and/or ground plane may be deposited, for example by electroplating or electroless plating. The second protective layer however, may be formed using a variety of suitable techniques, including chemical deposition (e.g., chemical vapor deposition), physical deposition (e.g., sputtering), or any other suitable deposition technique. Additional examples include any suitable patterning technique (e.g., photolithography), etching, and any other suitable subtractive technique. The ports may similarly be deposited using any of the above techniques in alternative or addition to electroplating or electroless plating.

The vias may be formed by a variety of suitable processes, including laser drilling holes through the base substrate and then filling (e.g., sputtering, electrolyessly plating) the internal surfaces of the holes with a suitable conductive material. In some embodiments, the through holes for the vias may be filled concurrently with the performance of another manufacturing step. For example, the vias may be drilled before the thin film components are formed such that both the vias and the thin film components may be simultaneously deposited. The vias may be formed from a variety of suitable materials including those described above with reference to the thin film components (e.g., thin-film microstrips and ground plane).

In some embodiments, the filter may include at least one adhesion layer in contact with the thin-film microstrips. The adhesion layer may be or include a variety of materials that are suitable for improving adhesion between the thin-film microstrips and adjacent layers, such as the base substrate and/or first protective layer (e.g., the ceramic cover substrate or polymeric layer). As examples, the adhesion layer may include at least one of Ta, Cr, TaN, TiW, Ti, or TiN. For instance, the adhesive layer may be or include tantalum (Ta) (e.g., tantalum or an oxide or nitride thereof) and may be formed between the microstrips and the base substrate to improve adhesion therebetween. Without being bound by theory, the material of the adhesion layer may be selected to overcome phenomena such as lattice mismatch and residual stresses.

The adhesion layer(s) may have a variety of suitable thicknesses. For example, in some embodiments, the thicknesses of the adhesion layer(s) may range from about 100 angstroms to about 1000 angstroms, in some embodiments from about 200 angstroms to about 800 angstroms, in some embodiments from about 400 angstroms to about 600 angstroms.

I. Example Embodiments

Figure 1B:
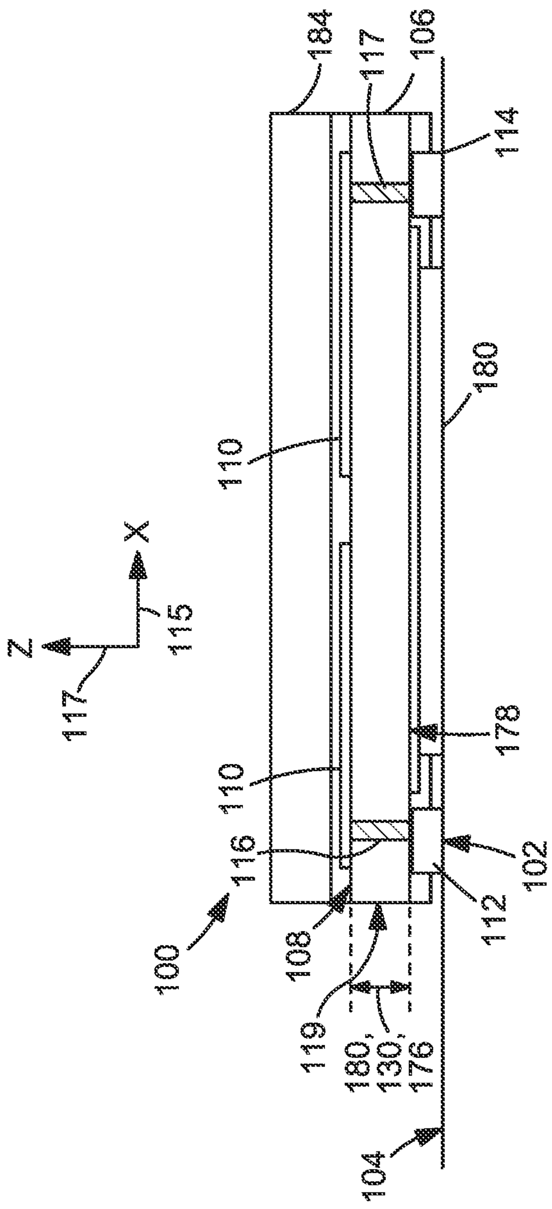
FIG. 1B illustrates a side elevation view of the filter of FIG. 1A.
Figure 1C:
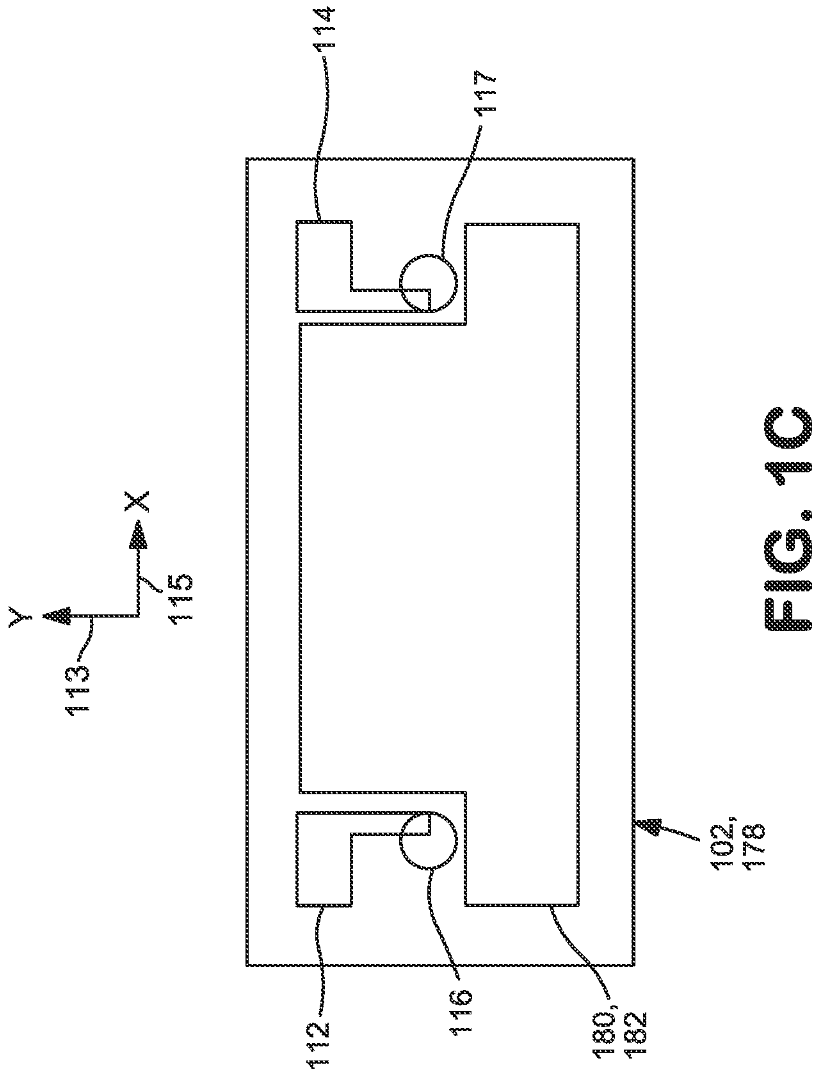
FIG. 1C illustrates a bottom surface of the filter of FIG. 1A.

FIG. 1A illustrates a top down view of one embodiment of a high frequency, stripline filter 100 in accordance with aspects of the present disclosure. FIG. 1B illustrates a side elevation view of the filter 100 of FIG. 1A. Referring to FIG. 1B, the filter 100 may have a bottom surface 102 for mounting to a mounting surface 104. FIG. 1C illustrates the bottom surface 102 of the filter 100. Referring to FIGS. 1A through 1C, the filter 100 may include a monolithic base substrate 106 having a top surface 108. A plurality of thin-film microstrips 110 may be formed over the top surface 108 of the monolithic base substrate 106. One or more ports 112, 114 may be exposed along the bottom surface 102 of the filter 110. For example, the one or more ports 112, 114 may include an input port 112 and/or an output port 114. The ports 112, 114 may be spaced apart in a Y-direction 113 that is perpendicular to an X-direction 115. Each of the Y-direction 113 and X-direction 115 may be perpendicular to a Z-direction 117. The ports 112, 114 may not extend along vertical, side surfaces 119 (FIG. 1B) of the filter 100. In some embodiments the vertical, side surfaces 119 of the filter 100 may be free of conductive material.

One or more via 116, 117 may be formed within the monolithic base substrate 106. The via(s) 116, 117 may electrically connect one of the thin-film microstrips 110 with one of the ports 112, 114 on the bottom surface of the filter 100. For example, an input via 116 may electrically connect a first thin-film microstrip 118 of the thin-film microstrips 100 to the input port 112. For example, an electrical connection path from the first thin-film microstrip 118 to the input port 112 may include the input via 116.

The conductive path between the first thin-film microstrip 118 and input port 112 may also include one or more elongated conductive strips. For example, a top conductive strip 120 may be elongated in the X-direction 115. The top conductive strip 120 may be formed over the top surface 108 of the monolithic base substrate 106 and connected with each of the first thin-film microstrip 118 and the input via 116. More specifically, the first thin-film microstrip 118 may include a first arm 124 that is elongated in the Y-direction 113. The top conductive strip 120 may be connected with the first arm 124 of the first thin-film microstrip 118.

The conductive path between the first thin-film microstrip 118 and input port 112 may also include a bottom conductive strip 122. The bottom conductive strip 120 may be connected with each of the input via 116 and the input port 112. The bottom conductive strip 122 may be perpendicular to the top conductive strip 122 elongated in the Y-direction 113.

Referring to FIG. 1A, the top conductive strip 120 may have a top conductive strip effective length 126 in the X-direction 115 between the first arm 124 of the first thin-film microstrip 118 and the input via 116. The bottom conductive strip 122 may have a bottom conductive strip effective length 128 in the X-Y plane (e.g., in the Y-direction 113) between the input via 116 and the input port 112.

Referring to FIG. 1B, the input via 116 may have a via length 130 in the Z-direction 117. An effective length of a conductive path between the input port 112 and the first arm 124 of the first thin-film microstrip 118 may equal a sum of the top conductive strip effective length 126, the bottom conductive strip effective length 128, and the via length 130. The effective length of a conductive path may be equal to about $\lambda/4$, where $\lambda$ is a wavelength that corresponds with the test frequency propagating through the monolithic base substrate 106. In other embodiments, the sum of the top conductive strip effective length 126, the bottom conductive strip effective length 128, and the via length 130 may be proportional to $\lambda/4$ (e.g., equal to $n\lambda/4$, where n is an integer). Additionally, the top conductive strip 120 may be perpendicular to the bottom conductive strip 122, which may provide a more compact configuration.

One or more of the thin-film microstrips 110 may generally be U-shaped. For example, the first thin-film microstrip 118 may include a second arm 132 that is parallel with the first arm 124. The first thin-film microstrip 118 may have a base portion 134 connected with the pair of parallel arms 124, 132. The base portion 134 may be perpendicular to the pair of parallel arms 124, 132. The first arm 124 may be considered perpendicular with the base portion 134 if at least one edge of the first arm 124 is perpendicular with at least one edge of the base portion 134. Alternatively, the first arm 124 may be considered perpendicular with the base portion 134 if a centerline of the first arm 124 is perpendicular with a centerline of the base portion 134. Similarly, the first arm 124 may be considered parallel with the second arm 132 if at least one edge of the first arm 124 is parallel with at least one edge of the second arm 132. Alternatively, the first arm 124 may be considered parallel with the second arm 132 if a centerline of the first arm 124 is parallel with a centerline of the second arm 132. For instance, one or both of the arms 124, 132 may be slightly tapered yet may still be parallel with each other and/or perpendicular with the base portion 134.

In some embodiments, the first thin-film microstrip 118 may have at least one rounded outer corner 136 between at least one of the pair of parallel arms 124, 132 and the base portion 134 of the first thin-film microstrip 118. Such rounded corners may reduce charge concentrations that may otherwise adversely affect performance of the filter. At least one of the parallel arms 124, 132 of the first thin-film microstrip 118 may have a width 138 that is less than about 200 microns.

The thin-film microstrips 110 may generally have an alternating configuration. Each successive thin-film microstrip 110 may be rotated 180 degrees in the X-Y plane with respect to a subsequent thin-film microstrip 110.

The thin-film microstrips 110 may be spaced apart to provide electromagnetic resonance at one or more select frequencies. In some embodiments, the thin-film microstrips 110 may be spaced apart from other thin-film microstrips 110 by respective spacing distances. In some embodiments, multiple distinct spacing distances may be employed to provide resonance at distinct frequencies within a passband of the filter 100. More specifically, the second arm 132 of the first thin-film microstrip 118 may be spaced apart by a first spacing distance 140 from a first arm 142 of a second thin-film microstrip 144 in the X-direction 115. The first spacing distance 140 may be less than about 250 microns.

The second thin-film microstrip 144 may have a second arm 146 that is elongated in the Y-direction and a base portion 145 connecting the first and second arms 142, 146. A third thin-film microstrip 147 may have a first arm 149, a second arm 151, and a base portion 152 is elongated in the Y-direction 113 and spaced apart in the X-direction 115 from the second arm 146 of the second thin-film microstrip 144 by a second spacing distance 148. The second spacing distance 148 may be different that (e.g., greater than or less than) the first spacing distance 140. In this example, the second spacing distance 148 is greater than the first spacing distance 140. A ratio of the second spacing distance 148 to the first spacing distance 140 may range from about 1.1 to about 10 or from about 0.1 to about 0.9.

The arms 124, 132, 142, 146 of the thin-film microstrips 110 may form overlapping distances therebetween. The length of the overlapping distances may be selected to tune the performance characteristics of the filter. More specifically, multiple distinct overlapping distances may be employed in some embodiments. For example, the first arm 142 of the second thin-film microstrip 144 and the first arm 124 of the first thin-film microstrip 118 may overlap in the Y-direction 113 along a first overlapping length 150. The second arm 146 of the second thin-film microstrip 144 and the first arm 149 of the third thin-film microstrip 147 may overlap in the Y-direction 113 along a second overlapping length 154. The first overlapping length 150 may be different from the second overlapping length 154. For example, the second overlapping length 154 may be about 75% to about 96% or about 104% to about 125% of the first overlapping length 150. In other embodiments, the second overlapping length 154 may be approximately equal to the first overlapping length 150.

The filter 100 may include a fourth thin-film microstrip 156 having a first arm 158, a second arm 160, and a base portion 162 connecting the first arm 160 and the second arm 162. The first arm 158 of the fourth thin-film microstrip 156 may overlap the second arm 151 of the third thin-film microstrip 147 along a third overlapping length 164. In some embodiments, the third overlapping length 164 may be different from one or both of the first overlapping length 150 and the second overlapping length 154. For example, the third overlapping length 164 may be about 75% to about 96% or about 104% to about 125% of the first overlapping length 150. In other embodiments, the third overlapping length 164 may be approximately equal to the first overlapping length 150. For example, the third overlapping length 164 may be about 97% to about 103% of the first overlapping length 140.

The first arm 158 of the fourth thin-film microstrip 156 may be spaced apart from the second arm 160 of the third thin-film microstrip 147 by a third spacing distance 166. In some embodiments, the third spacing distance 166 may be approximately equal to the first spacing distance 140. For example, the third spacing distance 166 may be about 97% to about 103% of the first spacing distance 140. In other embodiments, the third spacing distance 166 may be different from one or both of the first spacing distance 140 and the second spacing distance 148. For example, the third spacing distance 166 may be about 75% to about 96% or about 104% to about 125% of the first spacing distance 140.

In some embodiments, the arms of one or more of the thin-film microstrips may have different lengths such that a tip offset distance is formed between respective tips of the arms. For example, a first tip offset distance 153 may be formed between respective tips of the first arm 124 and second arm 132 of the first thin-film microstrip 118. The arms 142, 146 of the second thin-film microstrip 144 may have approximately equal lengths. Similarly, the arms 149, 151 of the third thin-film microstrip 147 may have approximately equal lengths. A second tip offset distance 155 may be formed between respective tips of the first arm 158 and second arm 160 of the fourth thin-film microstrip 156. The second tip offset distance 155 may be approximately equal to the first tip offset distance 153. For example, the second tip offset distance 155 may be about 96% to about 104% of the first tip offset distance 153.

The fourth thin-film microstrip 156 may be connected with the output port 114 through a conductive path that includes an output via 117. A top output conductive strip 168 and bottom output conductive strip 170 may generally be configured in a similar manner as the top conductive strip 120 and bottom conductive strip 122 described above with reference to the conductive path connecting the first thin-film microstrip 118 with the input port 112. The top output conductive strip 168 may have a top output conductive strip effective length 172. The bottom output conductive strip 170 may have a bottom output conductive strip effective length 174. The output via 117 may have an output via length 176 in the Z-direction 117. A total output conductive path length may equal a sum of the top output conductive strip effective length 172, the output bottom conductive strip effective length 175, and the output via length 176. The total output conductive path length may be equal to about $\lambda/4$, where $\lambda$ is the wavelength that corresponds with the test frequency propagating through the monolithic base substrate. In other embodiments, the total output conductive path length of lengths may be proportional to $\lambda/4$ (e.g., $n\lambda/4$, where n is an integer). For example, the total output conductive path length may range from about 95% to 105% of $n\lambda/4$, in some embodiments from about 96% to about 104%, in some embodiments from about 97% to about 103%, in some embodiments from about 98% to about 102%, and in some embodiments from about 99% to about 101%.

The monolithic base substrate 106 may have a bottom surface 178 opposite the top surface 108. A thickness 180 of the base substrate 106 may be defined in the Z-direction 117 between the top surface 108 and the bottom surface 178. The thickness 180 of the base substrate 106 may range from about 100 microns to about 600 microns.

The input port 112 and/or output port 114 may be on the bottom surface 178 of the base substrate 106. Thus, the input via length 130 and/or the output via length 176 may be equal to the thickness 180 of the base substrate 106. However, in other embodiments, multiple substrates or layers may be disposed between the thin-film microstrips 110 and the input port 112 and/or output port 114 such that the via lengths 130, 176 may be greater than the thickness 180 of the base substrate 106.

The filter 100 may include a ground plane 181 formed over the bottom surface 178 of the base substrate 106. Thus the ground plane 181 may be co-planar with the input port 112 and/or output port 114. The ground plane 181 may have a perimeter 182 in the X-Y plane that is parallel with the top surface 108 of the monolithic base substrate 106. At least one of the first thin-film microstrip 118 or the second thin-film microstrip 144 may be contained within the perimeter 182 of the ground plane 181 in the X-Y plane.

Referring to FIG. 1B, the filter 100 may include a first protective layer 184 formed over the top surface 108 of the monolithic base substrate 102. For example, the first protective layer 184 may include a cover substrate having a thickness 186 that ranges from about 100 microns to about 600 microns. In other embodiments, the protective layer 184 may include a polymeric material, such as polyimide, SiNO, $Al_2O_3$, $SiO_2$, $Si_3N_4$, benzocyclobutene, or glass. In such embodiments, the protective layer may have a thickness that ranges from about 1 micron to about 300 microns.

In some embodiments, the filter 100 may include a second protective layer 185 formed over the bottom surface 178 of the filter 100. The second protective layer 185 may include a polymeric material, such as polyimide, SiNO, $Al_2O_3$, $SiO_2$, $Si_3N_4$, benzocyclobutene, or glass. In some embodiments, the second protective layer 185 may be formed using photolithography techniques in a manner that leaves openings or windows through which the ports 112, 114 and ground plane 181 may be deposited, for example by electroplating.

Figure 2:
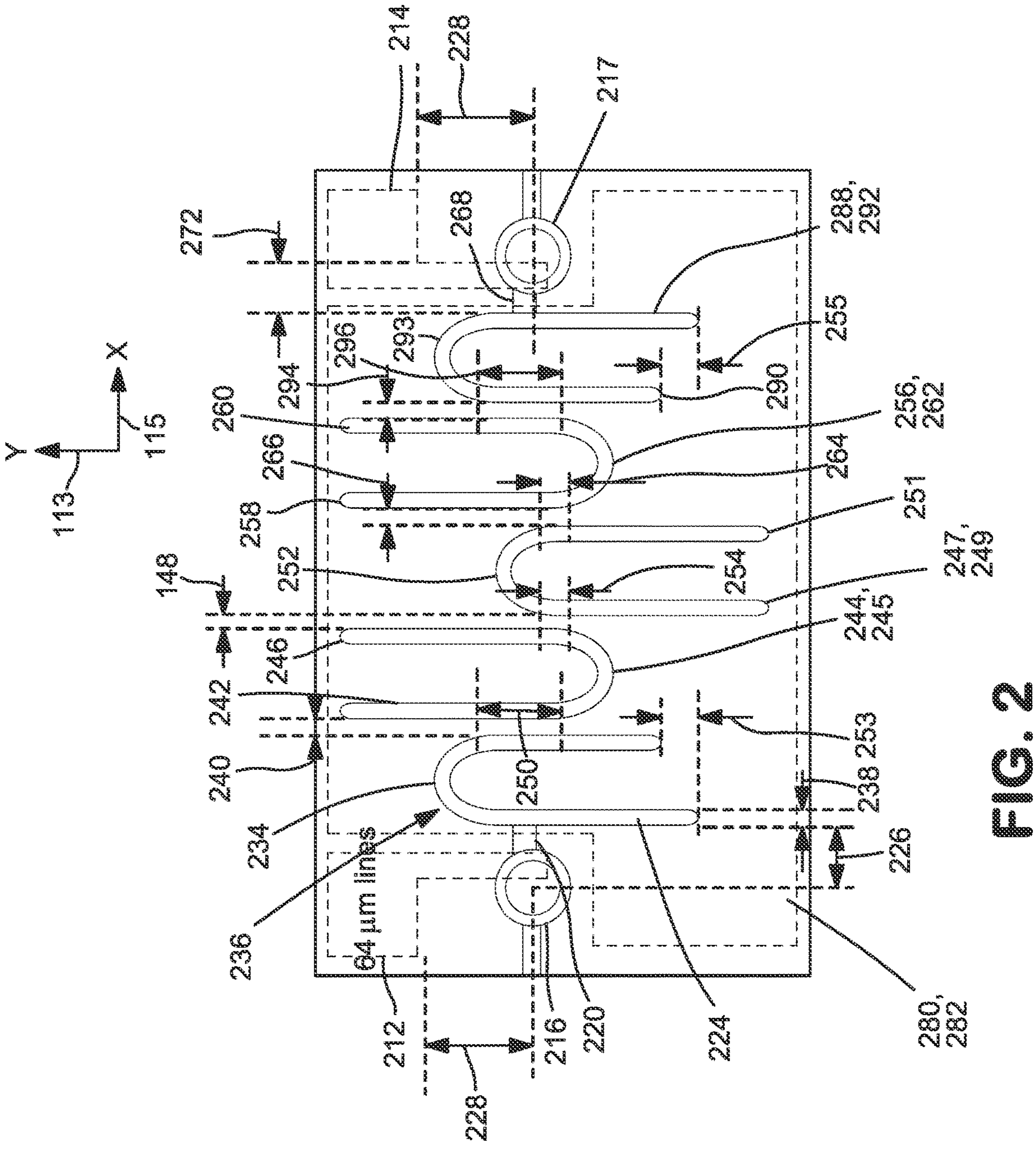
FIG. 2 illustrates a top down view of another embodiment of a high frequency, stripline filter in accordance with aspects of the present disclosure.

FIG. 2 illustrates a top down view of another embodiment of a high frequency, stripline filter 200 in accordance with aspects of the present disclosure. The filter 200 may general be configured as described above with reference to the filter 100 of FIG. 1 with several differences as described below. Similar reference numerals are used to refer to similar features between the filter 200 illustrated in FIG. 2 and the filter 100 illustrated in FIG. 1. The filter 200 may include a fifth thin-film microstrip 288 having a first arm 290, second arm 292, and a base portion 293 connected between the first and second arms 290, 291. The first arm 290 of the fifth thin-film microstrip 288 may be spaced apart from the second arm 260 of the fourth thin-film microstrip 256 by a fourth spacing distance 294. The first arm 290 of the fifth thin-film microstrip 288 may overlap the second arm 260 in the Y-direction 113 by a fourth overlapping distance 296. As illustrated, the fifth thin-film microstrip 288 may be connected with the top output conductive strip 268 instead of the fourth thin-film microstrip 256.

One or more of the base portions 234, 245, 152, 162, 293 of the thin-film microstrips 210 may generally be curved, for example defining parallel curved edges between the respective arms of thin-film microstrips 210. In some embodiments, one or more the base portions 234, 245, 152, 162, 293 may have a constant width between the respective arms. For instance, the base portions 234, 245, 152, 162, 293 may define a portion (e.g., half) of a circle.

II. Simulation Data

Figure 3:
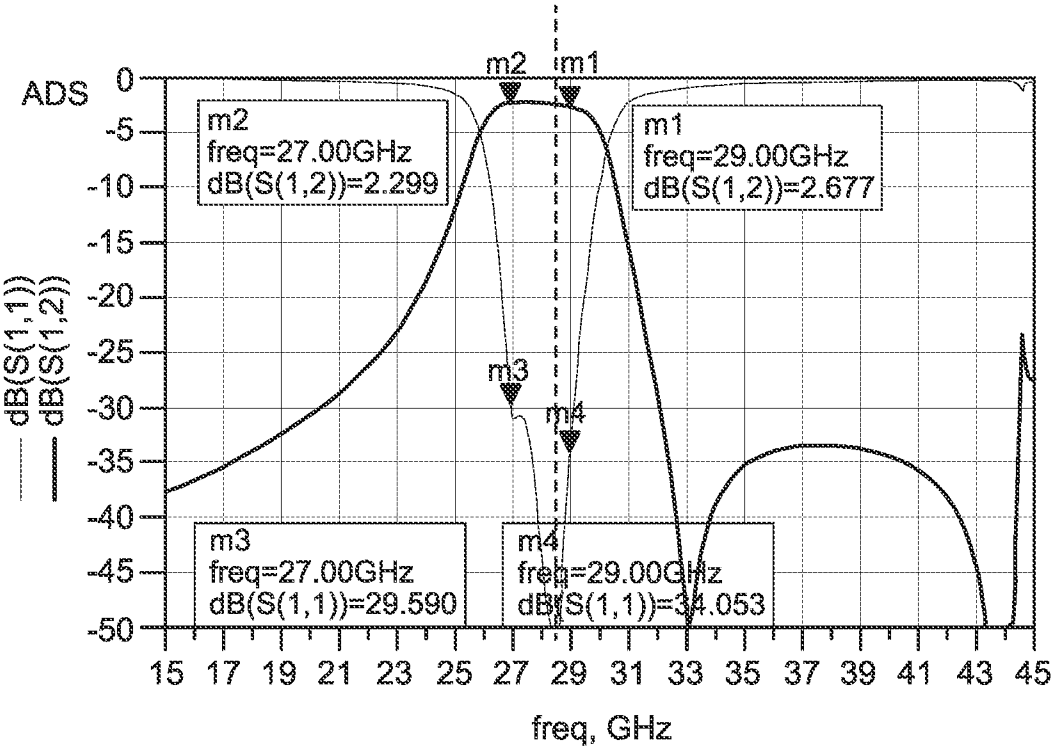
FIG. 3 illustrates simulated insertion loss ($S_{2,1}$) and return loss ($S_{1,1}$) data for the filter of FIGS. 1A through 1C.

FIG. 3 illustrates simulated insertion loss ($S_{2,1}$) and return loss ($S_{1,1}$) data for the filter 100 of FIGS. 1A through 1C. The simulation data shows low insertion loss ($S_{2,1}$) in a pass band frequency from 27 GHz to 29 GHz. More specifically, the insertion loss is greater than −2.67 dB from 27 GHz to 29 GHz. From frequencies that are than 3 GHz outside of the pass band frequency, the insertion loss response is less than −20 dB. In other words, the insertion loss is less than −20 dB for frequencies that are less than 24 GHz or greater than 32 GHz.

The simulated return loss ($S_{1,1}$) is less than −29.5 dB for frequencies ranging from about 27 dB to about 29 dB. The simulated return loss ($S_{1,1}$) is less than −45 dB at about 28.5 dB.

Figure 4:
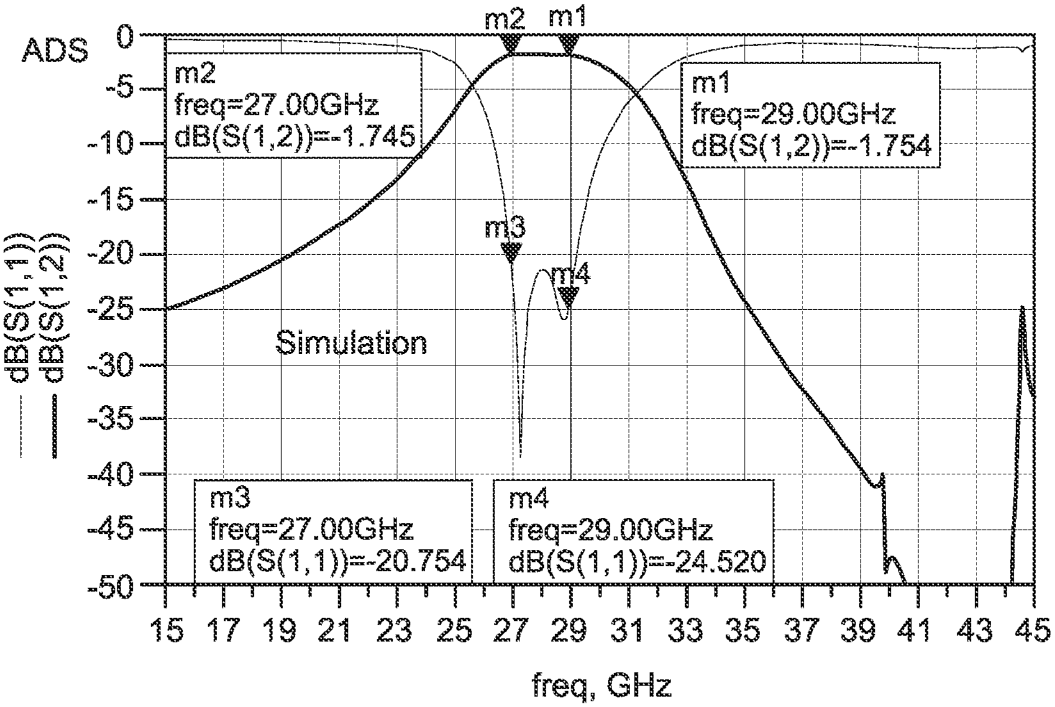
FIG. 4 illustrates simulated insertion loss ($S_{2,1}$) and return loss ($S_{1,1}$) data for the filter of FIG. 2.

FIG. 4 illustrates simulated insertion loss ($S_{2,1}$) and return loss ($S_{1,1}$) data for the filter 200 of FIG. 2. The simulation data shows low insertion loss ($S_{2,1}$) in a pass band frequency from 27 GHz to 29 GHz. More specifically, the insertion loss is greater than −2.67 dB from 27 GHz to 29 GHz. From frequencies that are than 3 GHz outside of the pass band frequency, the insertion loss response is less than −10 dB. In other words, the insertion loss may be less than −10 dB for frequencies that are less than 24 GHz or greater than 32 GHz.

The return loss ($S_{1,1}$) may be less than −10 dB for frequencies ranging from about 27 dB to about 29 dB. The simulated return loss ($S_{1,1}$) is less than −30 dB at about 27.5 dB.

Additionally, the return loss ($S_{1,1}$) may be less than −30 dB for frequencies ranging from about 37 GHz to about 44 GHz, in some embodiments less than about −40 dB for frequencies ranging from about 40 GHz to about 44 GHz, and in some embodiments less than about −45 dB for frequencies ranging from about 40 GHz to about 44 GHz.

III. Testing

Testing for insertion loss, return loss, and other response characteristics may be performed using a source signal generator (e.g., a 1306 Keithley 2400 series Source Measure Unit (SMU), for example, a Keithley 2410-C SMU). For example, an input signal may be applied to the input port of the filter, and an output signal may be measured at the output port of the filter using the source signal generator.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A high frequency, stripline filter having a bottom surface for mounting to a mounting surface, the filter comprising:

a monolithic base substrate having a top surface, a length in an X-direction, a width in a Y-direction that is perpendicular to the X-direction, and a thickness in a Z-direction that is perpendicular to each of the X-direction and Y-direction;

a plurality of thin-film microstrips comprising a first thin-film microstrip and a second thin-film microstrip, each of the plurality of thin-film microstrips having a first arm, a second arm parallel to the first arm, and a base portion connected with the first and second arms, the base portion being perpendicular each of the first and second arms; and wherein the plurality of thin-film microstrips are formed over the top surface of the monolithic base substrate;

a port exposed along the bottom surface of the filter; and a conductive path comprising a via formed in the monolithic base substrate, the conductive path electrically connecting the first thin-film microstrip with the port on the bottom surface of the filter;

wherein the filter exhibits an insertion loss that is greater than −3.5 dB at a frequency that is greater than about 15 GHz, and wherein the conductive path comprises a bottom conductive strip connected with each of the via and the port.

2. The filter of claim 1, wherein the frequency is about 28 GHz.

3. The filter of claim 1, wherein the filter exhibits an insertion loss response that is greater than −3.5 dB across a frequency range that ranges from about 27 GHz to about 29 GHz.

4. The filter of claim 1, wherein the filter exhibits a return loss that is less than about −10 dB at the frequency.

5. The filter of claim 1, wherein the filter exhibits a return loss response that is less than about −10 dB from about 27 GHz to about 29 GHz.

6. The filter of claim 1, wherein:

the conductive path comprises a top conductive strip connected with each of the via and the first arm of the first thin-film microstrip;

the top conductive strip has a top conductive strip effective length in the X-direction between the first arm of the first thin-film microstrip and the via;

the bottom conductive strip has a bottom conductive strip effective length in the X-Y plane between the via and the port;

the via has a via length in the Z-direction; and the effective length of the conductive path is equal to a sum of the top conductive strip effective length, the bottom conductive strip effective length, and the via length.

7. The filter of claim 1, wherein the bottom conductive strip is elongated in the Y-direction.

8. The filter of claim 1, wherein the first thin-film microstrip has at least one rounded outer corner between the base portion of the first thin-film microstrip and at least one of the first arm or second arm of the first thin-film microstrip.

9. The filter of claim 1, wherein at least one of the first arm or second arm of the first thin-film microstrip has a width that is less than about 200 microns.

10. The filter of claim 1, wherein:

the second arm of the second thin-film microstrip is elongated in the Y-direction; and the plurality of thin-film microstrips comprises a third thin-film microstrip, the first arm of the third thin-film microstrip being elongated in the Y-direction and spaced apart in the X-direction from the second arm of the second thin-film microstrip by a second spacing distance that is less than about 150 microns.

11. The filter of claim 10, wherein a ratio of the second spacing distance to the first spacing distance ranges from about 1.1 to about 10.

12. The filter of claim 10, wherein:

the first arm of the second thin-film microstrip and the second arm of the first thin-film microstrip overlap in the Y-direction along a first overlapping length;

the second arm of the second thin-film microstrip and the first arm of the third thin-film microstrip overlap in the Y-direction along a second overlapping length; and the second overlapping length ranges from about 75% to about 96% of the first overlapping length or ranges from about 104% to about 125% of the first overlapping length.

13. The filter of claim 1, wherein the monolithic base substrate has a bottom surface opposite the top surface, and wherein the filter further comprises a ground plane formed over the bottom surface of the base substrate.

14. The filter of claim 1, wherein the thickness of the monolithic base substrate is less than about 500 microns.

15. The filter of claim 1, wherein the monolithic base substrate comprises a material having a dielectric constant that is less than about 30 as determined in accordance with ASTM D2520-13 at an operating temperature of 25° C. and frequency of 28 GHz.

16. A method of forming a high frequency, stripline filter having a bottom surface for mounting to a mounting surface, the method comprising:

providing a monolithic base substrate having a top surface;

forming a plurality of thin-film microstrips comprising a first thin-film microstrip and a second thin-film microstrip over the top surface of the monolithic base substrate;

depositing a port along the bottom surface of the filter; and forming a via in the monolithic base substrate that electrically connects the first thin-film microstrip with the port on the bottom surface of the filter;

wherein the filter exhibits an insertion loss that is greater than −3.5 dB at a frequency that is greater than about 15 GHz.

17. The method of claim 16, wherein each of the plurality of thin-film microstrips has a first arm, a second arm parallel to the first arm, and a base portion connected with the first and second arms, the base portion being perpendicular each of the first and second arms, and wherein the filter exhibits a return loss that is less than about −10 dB at the frequency.

18. A high frequency, stripline filter having a bottom surface for mounting to a mounting surface, the filter comprising:

a monolithic base substrate having a top surface, a length in an X-direction, a width in a Y-direction that is perpendicular to the X-direction, and a thickness in a Z-direction that is perpendicular to each of the X-direction and Y-direction, the thickness less than about 500 microns;

a first thin-film microstrip and a second thin-film microstrip, each of the first thin-film microstrip and the second thin-film microstrip having a first arm, a second arm parallel to the first arm, and a base portion connected with the first and second arms, the base portion being perpendicular each of the first and second arms, the first thin-film microstrip and the second thin-film microstrip each formed over the top surface of the monolithic base substrate;

a port exposed along the bottom surface of the filter; and a conductive path comprising a via formed in the monolithic base substrate, the conductive path electrically connecting the first thin-film microstrip with the port on the bottom surface of the filter;

wherein the filter exhibits an insertion loss that is greater than −3.5 dB at a frequency that is greater than about 15 GHz.

19. The filter of claim 18, wherein the monolithic base substrate comprises a material having a dielectric constant that is less than about 30 as determined in accordance with ASTM D2520-13 at an operating temperature of 25° C. and frequency of 28 GHz.

20. The filter of claim 18, wherein the monolithic base substrate comprises alumina.

* * * * *